(12) United States Patent
Nyland

(10) Patent No.: US 6,629,037 B1
(45) Date of Patent: Sep. 30, 2003

(54) OPTIMAL PATHS FOR MARINE DATA COLLECTION

(75) Inventor: David Lee Nyland, Palmer, AK (US)

(73) Assignee: WesternGeco, L.L.C., Houston, TX (US)

( * ) Notice: Subject to any disclaimer, the term of this patent is extended or adjusted under 35 U.S.C. 154(b) by 511 days.

(21) Appl. No.: 09/603,068

(22) Filed: Jun. 26, 2000

(51) Int. Cl.[7] ................................................. G01V 1/28
(52) U.S. Cl. ........................................................ 702/14
(58) Field of Search ...................... 702/14, 16; 367/14, 367/15, 16, 19, 20

(56) References Cited

U.S. PATENT DOCUMENTS

| | | | | |
|---|---|---|---|---|
| 3,790,929 A | * | 2/1974 | Mayne et al. | 367/21 |
| 4,561,073 A | | 12/1985 | Aeter et al. | 367/19 |
| 6,182,014 B1 | * | 1/2001 | Kenyon et al. | 702/14 |

FOREIGN PATENT DOCUMENTS

| | | |
|---|---|---|
| GB | 2 323 668 | 9/1998 |
| WO | WO 01/33256 | 5/2001 |

OTHER PUBLICATIONS

Highly Parallelizable Route Planner Based on Cellular Automata Algorithms, XP–001032055, P.N. Stiles and I.S. Glickstein, IBM J. Res. Develop. vol. 38 No. 2, Mar. 1994, pp. 167–181.

"Route Planning", Peter Stiles et al.; pp. 421–425; Proceedings from the IEEE–AIAA 10th Digital Avionics Systems Conference, Oct. 14–17, 1991.

"Response of a Towed Thin Flexible Cylinder in Viscous Fluid", H. O. Pao et al.; pp. 1441–1444; Letters to the Editor; The Journal of the Acoustical Society of America; vol. 53, No. 5, 1973.

"Wireability of Knock–Knee Layouts with 45 Degree Wires", C. Chiang et al; pp. 613–624; IEEE Transactions on Circuits and Systems; Jun. 1991, vol. 38, No. 6.

"A Modification of Lee's Path Connection Algorithm", Sheldon B. Akers, Jr.; pp. 97–98; IEEE Transactions on Electronic Computers, Feb. 1967, vol. EC–16, No. 1.

"Searching for an Optimal Path Through Pasadena", G. J. Grevera et al.; pp. 308–319; IEEE, 1989.

"An Algorithm for Path Connections and its Applications", C. Y. Lee, pp. 346–365; IRE Transactions on Electronic Computers, Sep. 1961.

"A Technique for Autonomous Underwater Vehicle Route Planning", Charles W. Warren; pp. 199–204; IEEE Oceanic Engineering, Jul. 1990, vol. 15, No. 3.

* cited by examiner

Primary Examiner—Donald E. McElheny, Jr.
(74) Attorney, Agent, or Firm—David S. Figatner; Madan, Mossman & Sriram

(57) ABSTRACT

A method for finding an optimal path in seismic in fill shooting using a neural network to estimate cable feathering and uses multiple off set cost maps and potentials in cellular automata. The process determines cable coordinates at each cell location and store the coordinates of a predecessor cell to eliminate multiple paths.

20 Claims, 6 Drawing Sheets

FIG. 1

| START | ▨ |   |   | 5 | 4 | 3 |
|---|---|---|---|---|---|---|
|   | ▨ |   | ▨ | 4 | 3 | 2 |
|   |   |   | ▨ | 3 | 2 | 1 |
|   |   |   |   | ▨ | 1 | GOAL |
|   | ▨ |   |   |   | 3 | 2 | 1 |
|   |   | ▨ |   | ▨ |   | 3 | 2 |

FIG. 2

| START | ▨ | 7 | 6 | 5 | 4 | 3 |
|---|---|---|---|---|---|---|
| 10 | ▨ | 8 | ▨ | 4 | 3 | 2 |
| 9 | 8 | 7 | ▨ | 3 | 2 | 1 |
| 10 | ▨ | 6 | 5 | ▨ | 1 | GOAL |
| 9 | 8 | ▨ | 4 | 3 | 2 | 1 |
| 8 | 7 | 6 | 5 | ▨ | 3 | 2 |

FIG. 3

| START | ▨ | 7 | 6 | 5 | 4 | 3 |
|---|---|---|---|---|---|---|
| 10 | ▨ | 6 | 5 | 4 | 3 | 2 |
| 9 | 8 | 7 | ▨ | 3 | 2 | 1 |
| 10 | ▨ | 6 | 5 | ▨ | 1 | GOAL |
| 9 | 8 | ▨ | 4 | 3 | 2 | 1 |
| 8 | 7 | 6 | 5 | ▨ | 3 | 2 |

| START | ▨ | 1 | 1 | 1 | 1 | 1 |
|---|---|---|---|---|---|---|
| 1 | ▨ | 1 | 1 | 1 | 1 | 1 |
| 1 | 1 | 1 | ▨ | 1 | 1 | 1 |
| 1 | ▨ | 1 | 1 | ▨ | 1 | GOAL |
| 1 | 1 | ▨ | 1 | 1 | 1 | 1 |
| 1 | 1 | 1 | 1 | ▨ | 1 | 1 |

*FIG. 4*

| START | ▨ | 1 | 1 | 1 | 1 | 1 |
|---|---|---|---|---|---|---|
| 1 | ▨ | 1 | 1 | 1 | 1 | 1 |
| 1 | 1 | 1 | ▨ | 1 | 1 | 1 |
| 1 | ▨ | 1 | 1 | ▨ | 1 | GOAL |
| .5 | .1 | ▨ | 1 | 1 | 1 | 1 |
| 1 | 1 | 0 | 1 | ▨ | 1 | 1 |

*FIG. 5*

| START | ▨ | 7 | 6 | 5 | 4 | 3 |
|---|---|---|---|---|---|---|
| 8.7 | ▨ | 6 | 5 | 4 | 3 | 2 |
| 7.7 | 8 | 7 | ▨ | 3 | 2 | 1 |
| 6.7 | ▨ | 6 | 5 | ▨ | 1 | GOAL |
| 6.6 | 6.1 | ▨ | 4 | 3 | 2 | 1 |
| 7 | 6 | 5 | 5 | ▨ | 3 | 2 |

OPTIMAL PATHS FOR MARINE DATA COLLECTION

BACKGROUND OF THE INVENTION

1. Field of the Invention

The present invention relates to the optimization of infill survey paths for marine seismic surveys, which are designed to uniformly sample subsurface horizons.

2. Related Art

In seismic surveys, much of the subsurface is not properly sampled due to cable feathering. Thus in order to sample those areas that were missed on the first pass, a seismic vessel is required to make additional passes through a prospect survey area, which significantly increases the time and associated cost to complete a survey. These secondary paths are referred to as "infill shooting". There are an infinite number of possible paths which the vessel may traverse during the infill portion of the survey. Moreover, in many cases, the optimal infill path is difficult to determine. If optimal infill paths can be identified, however, it significantly lowers the total effort and expense associated with seismic data collection. Thus, there is a need for an efficient means of determining optimal infill paths in seismic surveying.

A large portion of marine data collection is devoted to the infill portion of a prospect. The infill may take up to several weeks to complete. Since the typical operating costs of a seismic vessel exceed $50,000 per day, the infill data is very expensive. Thus, optimal infill shooting would result in an enormous cost savings for surveying each seismic prospect. These large cost reductions would provide a competitive advantage in the marine data collection market.

There are many known techniques that have been utilized in an attempt to optimize a given set of data. For example, genetic algorithms, simulated annealing, cellular automata, and calculus-based algorithms have all been used to optimize different physical quantities. Many known procedures have been developed for finding the shortest route between two points. One of the more useful techniques was advanced by Lee. Lee's algorithm is able to find the shortest path between two points on a rectangular grid containing obstacles. In Lee's scheme, movement is restricted to the vertical and horizontal directions. Referring to FIG. 1, a shortest path route is developed in the following manner: Starting with a "goal" cell, a "1" is placed in all adjacent empty cells as shown in FIG. 1. Next, a "2" is placed in any cell which borders a cell containing a value of "1". This process continues until the "start" cell is reached.

The optimal path is determined by beginning at the "start" cell 100 and moving to the bordering cell 102 with the lowest numeric value. Note that during the path generation phase, diagonal moves are permitted, however, in some cases they may not be allowed. For example, a cab driver must keep his vehicle on paved roads and may not take a diagonal path through private property. The optimal path 103 for the preceding example is shown in FIG. 2.

Removing one of the object cells 104, results in multiple path solutions 105, 106, however, as shown in FIG. 3. When equal cost solutions exist, the problem is referred to as a digital indiscrimination problem. Each separate path is referred to as a geodesic. In this example only two equal paths exist. A larger map containing several thousand cells could yield dozens of equivalent geodesics. At first glance, the digital indiscrimination issue may not appear to be problematic, however, in many cases one path may be preferred over another. For example, a straighter path may be favored over one that has several turns.

Moreover, the shortest path does not always mean it is also the least cost path. Consider the problem of a traveling salesman attempting to drive to the airport on the other side of town. The salesman has the choice of taking the long freeway route around town or the shorter drive, straight through the middle of the city. The short route through town might enable the salesman to catch an earlier flight and make additional sales, however, if there are traffic jams in the city, getting stuck in traffic could cause the salesman to miss both flights.

In the traveling salesman example the least cost path depends on the time of day the salesman wants to drive to the airport. In general, determining an optimal route depends on a number of factors. Unlike the shortest path algorithm, the least cost technique requires an initial "cost map". Cost maps are generated by subdividing a map of an area into an array of cells. A cost value is assigned to each map cell. Cost values typically represent the cost incurred in moving from one map cell to another. For the two dimensional salesman problem, the freeway path would be assigned a low cost value and areas of high traffic density in the city would be assigned a higher cost value. Obstacles such as lakes, rivers, or canyons would be assigned very large cost values. By correctly processing the resulting cost map, the salesman would be able to generate a "best cost map". This map will enable him to determine the optimal route to the airport.

If all non-object cells in a cost map are equally weighted, the resulting best-cost map is equivalent to a shortest path map. For example, consider the least cost map shown in FIG. 4. Each entry in the example of FIG. 4 represents the cost of moving from one cell to another. All cells in the best-cost map are initialized with large integers. To generate a final best cost BC map, we can utilize the Stiles and Glickstein method (see P. N. Stiles and I. S. Glickstein [1994], "Highly Parallelizable Route Planner Bases on Cellular Automata Algorithms." IBM J. RES. Develop. Vol. 38 No. 2 March 1994, pp. 167–181). The Stiles and Glickstein method begins by setting the goal cell in the BC map equal to zero and adds the map cost of an adjacent cell ($MC_j$). The cost for moving to cell $BC_j$ is therefore calculated as:

$$\text{cost} = BC_i + MC_j$$

where $BC_i$=best cost value for current cell I $MC_j$=map cost of cell adjacent to current cell The cost for moving to another cell adjacent cell, BC is then calculated. If the resulting cost is less than the $BC_j$, the map cost is replaced with the new value, i.e., $BC_j$=cost. Since the value for $BC_j$ has changed, the cell is placed on a "TO DO" list for further processing. The same procedure is followed for all adjacent cells. When all bordering cells have been processed, the cell at the top of the TODO list is then processed in a similar manner. The cells on the TODO list are processed until the TODO list is empty. The pseudo code developed for this process is shown below in table 1 (see, P. N. Stiles, I. S. Glickstein, [1994] pp. 167–181).

TABLE 1

2D serial implementation of Cellular automata algorithm
(P. N. Stiles, L. S. Glickstein, [1994] pp. 167–181).

1. Initialization

Set all $BC_j = \infty$
    All Mail Flags $MF_j$
    TODO list is empty
    $BC_{goal} = 0$ 2. Cost minimization: loop until TODO list is empty Cost – $BC_j + MC_j$
    If cost < $BC_j$
    $BC_j$ = cost
    If $MF_j$ = false add j to TODO list and set $MF_j$ = true 3. Path generation First path cell = start cell
    Loop until goal cell is reached
      Examine BC value of each nearest neighbor
      (eight neighbors for 2D)
      Select next path cell as cell with lowest BC value Notation $BC_j$ is the $I^{th}$ element of best-cost propagation array
  (e.g. $BC_{start}$ = value of BC at the path start position
$MC_1$ is the $I^{th}$ element of map-cost array MC.
Mfi is the $I^{th}$ element of mail-flag array MF, which
  Indicates that a cell is on the TODO list
TODO list is a list of cells that can potentially
  Update their neighbors

---

The final BC map is identical to the map shown in FIG. 2. Now, consider a slightly modified BC map as shown in FIG. 5. If the least cost algorithm is applied to this BC map, a completely different path 107 is generated, as shown in FIG. 6. The path is now longer than the path calculated by the shortest route algorithm, however, the travel cost is less.

In the above examples, a cost was assigned to each cell. These costs may be a function of many different variables. It is possible to create n-dimensional least cost models. For example, time may be an additional dimension. The number of cells considered thus far in the examples is relatively small. Applications involving real maps, having thousands of individual cells makes finding a least cost route a substantially complex and formidable task. Thus, there is a need for an efficient method of determining a optimal path for infill shooting a seismic prospect area

SUMMARY OF THE INVENTION

The present invention provides an efficient method for determining optimal paths using multiple offset cost maps. In the present invention, cellular automata are utilized to determine optimal paths for the infill portion of a seismic survey cell values are represented as potentials. The fundamental concept of the "least cost path" is enhanced and applied to marine seismic operation to optimize seismic vessel paths during infill shooting. The inventor knows of no prior method, which attempts to find an optimal route for a seismic vessel using multiple cost maps.

BRIEF DESCRIPTION OF THE DRAWINGS

FIG. 1 illustrates an assignment of the cell values for a shortest path map;

FIG. 2 illustrates an optimal path for the map shown in FIG. 1;

FIG. 3 illustrates multiple path solutions for a shortest path map;

FIG. 4 illustrates equally weighted "map costs" for a least cost map;

FIG. 5 illustrates a modified cost map;

FIG. 6 illustrates a least cost path;

DETAILED DESCRIPTION OF THE PREFERRED EMBODIMENT

For a detailed understanding of the present invention, references should be made to the following detailed description of the preferred embodiment, in conjunction with the accompanying drawings.

Marine seismic surveys are designed assuming uniform subsurface target horizons. In a theoretically perfect world, a seismic vessel need only make a single pass along any given shot line and this single pass would result in complete subsurface coverage. Unfortunately, this seldom, if ever, occurs. In many cases, large portions of the target horizons are not uniformly sampled. Reduced coverage is generally attributed to cable feathering or spreading caused by local undercurrents. To collect the missing data, the seismic vessel is required to make additional passes over the prospect (infill shooting). Due to the high vessel costs, it is desirable to find an optimal infill survey track though the prospect.

Figure 7:
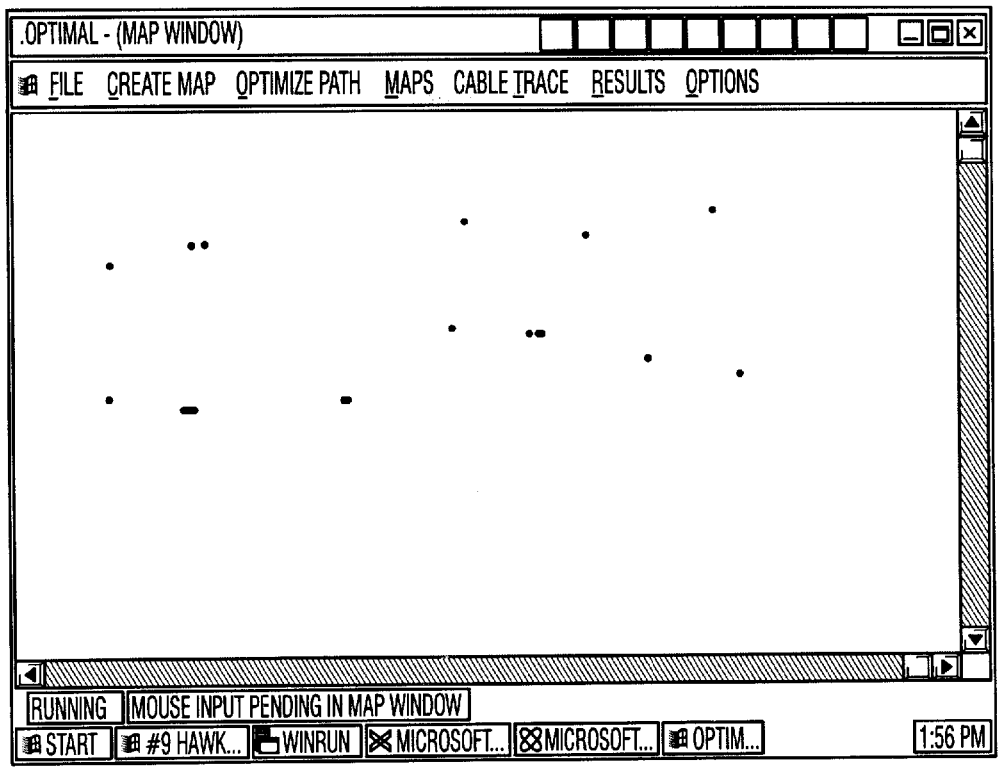
FIG. 7 illustrates a screen capture of a model infill prospect in a preferred embodiment of the present invention.
Figure 8:
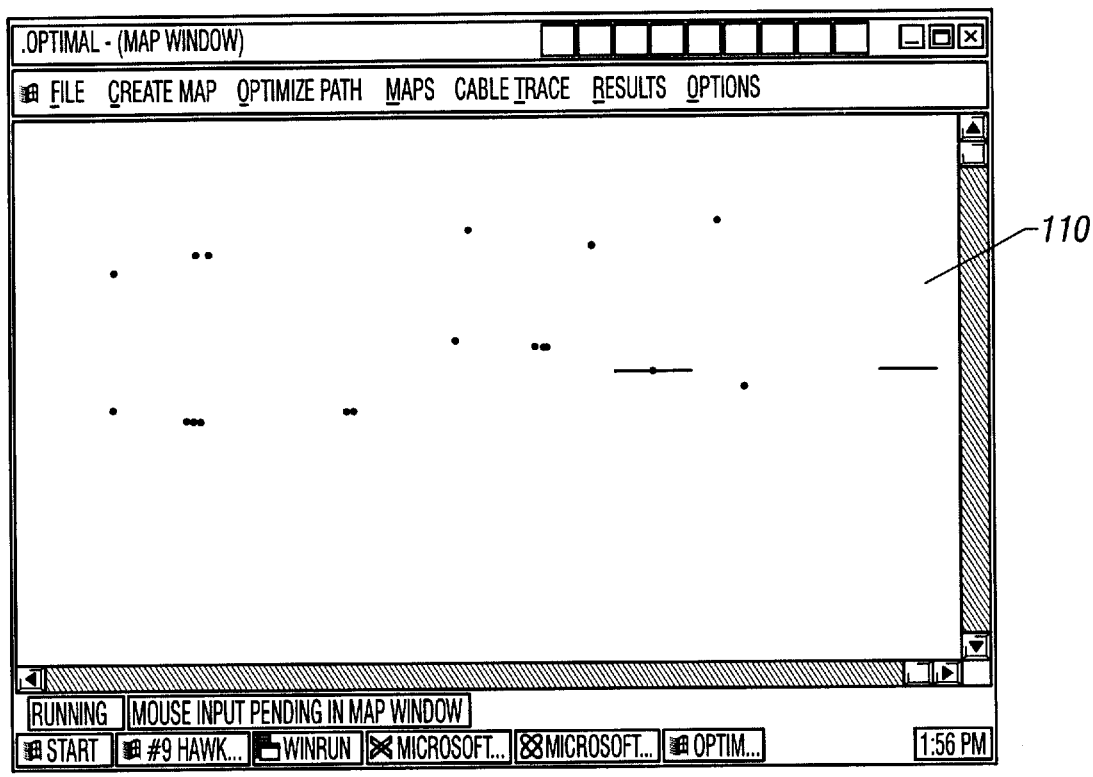
FIG. 8 illustrates an optimal single pass route in a preferred embodiment of the present invention.

An optimal path is defined as that pass through a seismic prospect area which results in acquiring the most data. For example, consider the highly simplified infill map of FIG. 7. A single pass is defined as a track entering the prospect from the East (right) and exiting to the West (left). The vessel route is not permitted to loop back on itself. The optimal track 110 is shown in FIG. 8.

The stair step appearance of the optimal track is caused by restricting movement to cell centers. Well known algorithms exist to remove the stair stepping and smooth out the path. Out of a total of 19 near cells shown in FIG. 8, the optimal route eliminates 13 of them. In this very simplistic example, the optimal path is obvious. However, for complex maps, which potentially contain tens of thousands of cells, the optimal path is not obvious. To further complicate matters, there are many different offset ranges to consider. Note that the above path was calculated for near offsets only. To calculate optimal paths which take into account all offset ranges requires major modifications to a least cost path algorithm.

Figure 9:
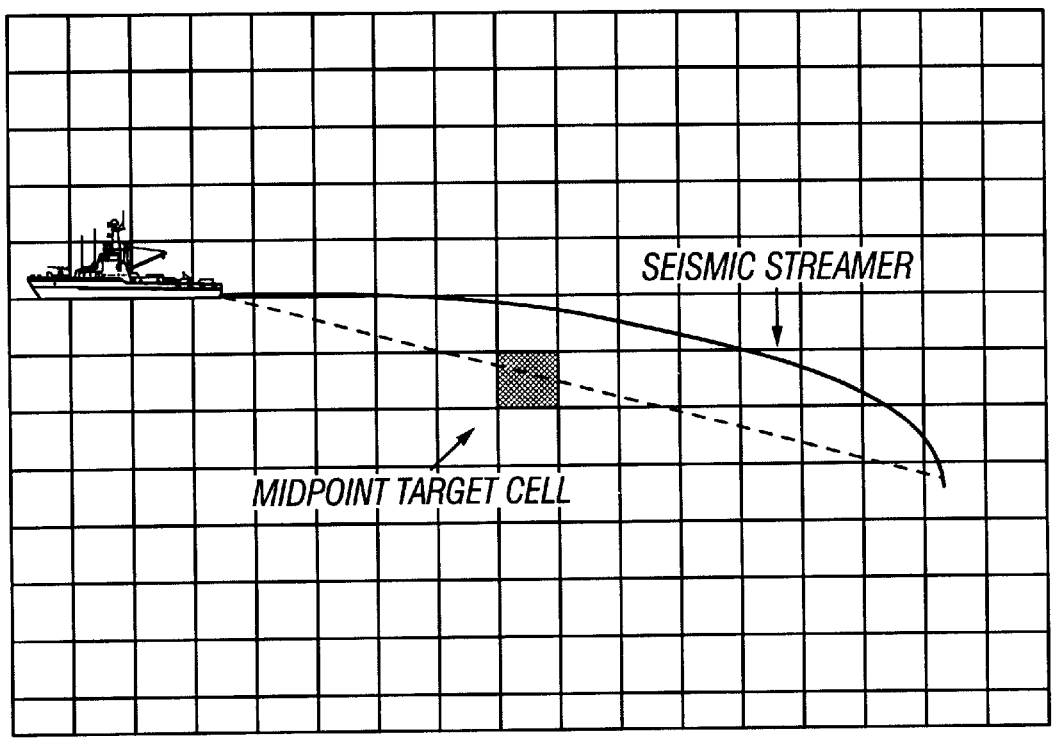
FIG. 9 illustrates an optimal path which requires the midpoint of the cable to pass over the far cell, rather than the towing vessel, in a preferred embodiment of the present invention.

Near trace optimization is, however, relatively straightforward. In this case, we can assume a coincident shot and receiver location. By assigning low cost values to the near cells, the optimal path problem is reduced to finding the least cost route across the seismic prospect area. The same strategy, however, does not work for optimizing mid or far trace cells. If we attempt to use the near trace method on far cells, the seismic vessel simply passes directly over the desired cells. Thus, it is required that the midpoint between the shot array and the far receiver pass over the data cell, as shown in FIG. 9.

Determining cable shape is another factor in determining optimal paths for middle or far traces. For example, if the seismic vessel travels NW and changes direction to the West, determination of the cable shape enhances calculation of the optimal path midpoint coordinates. Thus, it is desirable to have a function which determines the cable shape before and after the seismic towing/source vessel changes course. Calculating the cable shape based upon theoretical considerations has previously not been computationally feasible, the calculation having too many variations and unknowns for on vessel processing power. Even under very simple steady state coordinates the equations have been very complicated (see, e.g., Krail and Brysk, Geophysics, Vol. 54 No. 3, March 1989, pp. 302–308).

In a preferred embodiment, a trained neural network is provided to predict the position of the streamer cable during optimal path determination. Cable functions or hardware implementing functions or neural networks can be utilized to determinable locations. In several tests, a neural net was trained to satisfactorily predict the behavior of an arbitrary synthetic cable. A training data set can be gathered by digital recording cable movement relative to vessel movement during test or actual operations. The training set can be utilized to train the neural net to determine cable position during infill optimal path determination. The results of the tests have been very encouraging. One may select a function that emulates the cable shape. For example, in an alternative time embodiment, the following cable function was derived by observing how a string behaves when pulled through water.

Let $(X_n, Y_n)$ be the coordinates of the front of the streamer after it has moved to the new cell location. The slope of a line extending to the old position $(X_2, Y_2)$ is given by:

$$\text{Slope} = m = \frac{Y_n - Y_2}{X_n - X_2} \tag{1}$$

Each receiver element is separated by a distance d. The distance along a line from $(X_n, Y_n)$ to $(X_2, Y_2)$ may be written as:

$$d = \sqrt{(x_n - x_2)^2 + (y_n - y_2)^2} \tag{2}$$

Substituting equation 1 into equation 2 and solving for the new $X_2$ coordinate yields:

$$X_2 = X_n - \frac{d}{\sqrt{1 + m^2}} \tag{3}$$

In a similar manner, the equation for the new $Y_2$ coordinate is given by:

$$y_2 = y_n - \frac{md}{\sqrt{1 + m^2}} \tag{4}$$

Now that new $X_2$ and $Y_2$ coordinates are calculated, the same procedure is applied between the new $(X_2, Y_2)$ and the old $(X_3, Y_3)$ to obtain new coordinates for $(X_3, Y_3)$. Thus the procedure is recursive and consequently, it is computationally fast and efficient.

Recall that the "best cost maps" in the previous examples were generated by summing the current "best cost cell" with the "cost map cell" lying to the North, South, East or West. The infill algorithm of the present invention does not build a BC map in this manner, instead the novel optimization strategy of the present invention relies on a search forward technique. In the search forward method of the present invention, vessel movement is restricted to cells lying forward of the vessel to the Northwest, West, and Southwest. This forward constraint prevents the cable from looping back on itself. The greatest disadvantage of this technique is that the seismic vessel will not be able to make turns greater than 45 degrees, however, this is not a serious restriction.

Figure 10:
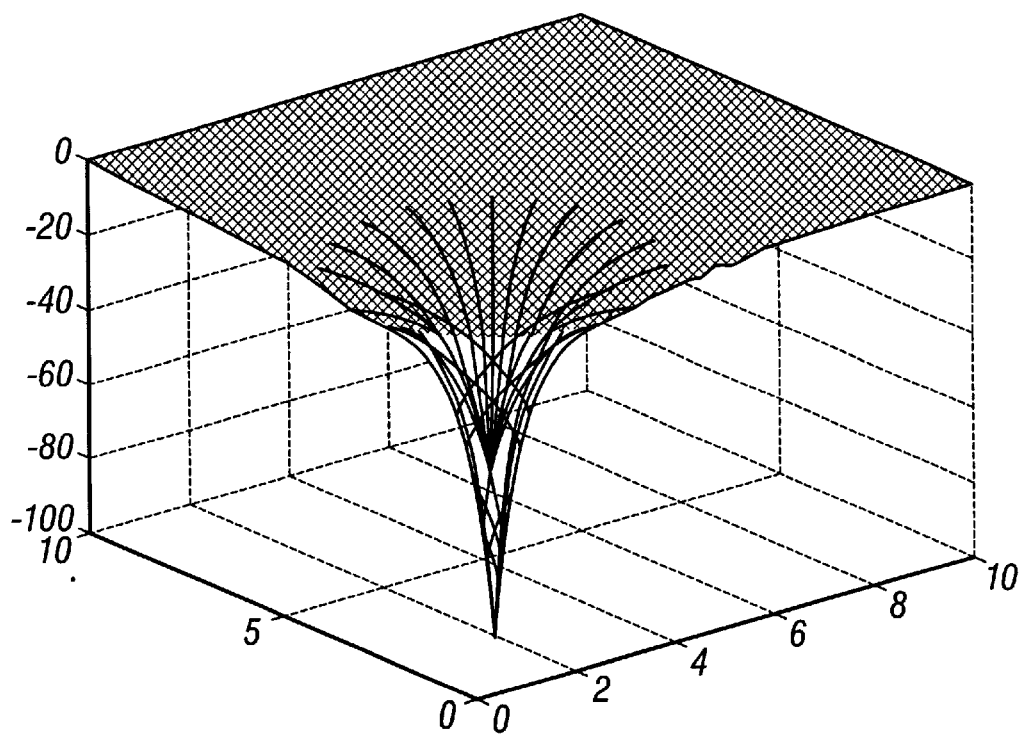
FIG. 10 illustrates a single potential represented as distributed values over the entire map, in a preferred embodiment of the present invention.

The low cost cells assigned to the BC maps may be viewed as step functions superimposed over a constant background level. It was found that in many cases that these "pole on a pedestal" functions often lead to multiple paths. This is especially true for sparse maps. In addition, the resulting paths may be quite irregular and require smoothing. The present invention solves these problems by replacing the step values with potentials. The localized nature of the target cells is thereby spread over the entire map as shown in FIG. 10, by the function:

$$cellvalue = \frac{-W_i}{(1 + R^n)} \tag{5}$$

where Wi is an index that specifies the weight of the near, mid and far cells. The variable n is a user defined integer and R is the distance from the target cell to any other cell in the map. Note that as n approaches infinity, the equation reduces to a step function. Potentials of this type produce smoother paths and reduce the incidence of multiple routes.

A typical near trace map contains hundreds or even thousands of target cells, each cell generating its own potential field. Thus, a map viewed in three dimensions resembles an inverted mountain range. Optimizing the path is a matter of choosing a course of minimum potentials as a hiker on a mountain range may stick to the valleys (i.e. minimum potentials) as much as possible.

A marine seismic vessel tows several steamers containing hundreds of receiver groups. Ideally, a BC map is built for each different receiver offset range. A preferred embodiment of the present invention builds cost maps for three offset ranges corresponding to near, middle, and far traces. For multiple BC maps, the cost is calculated as follows:

$$\text{Cost}(j) = BC(i) + \sum_{1}^{m} MC_m(k)$$

where
   i=serial address of vessel
   j=serial address of destination cell (6)
   k=serial address of midpoint cell
   m=index for offset range Optimizing the vessel track involves many BC maps. Note that in equation 6 the cost is calculated from various midpoints and not from the vessel location. Returning to the hiker analogy, this technique is much like having a mountaineering team tied together but each member is located in a different mountain range. The hikers are not completely free to choose individual paths because they are roped together. The task is to find a path through the mountain ranges such that the sum of each member's potential energy is a minimum.

The potential maps produce smoother routes and reduce occurrences of the digital indiscrimination, however, multiple routes may still occur. While multiple maps are not a particularly disturbing problem for near trace optimization, they present substantial difficulties when dealing with multiple BC maps. Recall that a least cost path is selected by beginning with a "start cell" and moving into the bordering cell with the least cost. The process is repeated until the goal cell is reached. If this technique is used in conjunction with the multiple maps, a "cable jump" or visually perceptible cable movement on the display may appear after the path is selected. Cable jumps occur when the wrong path is selected in a multiple path solution. The standard method of determining the least cost path works correctly up to the point where a path splits. At this point, a choice of which branch to follow is made. Choosing the cell which was not responsible for updating the present cell cable coordinates causes a break in cable continuity.

In the present invention, when a best-cost cell is updated, the cable coordinates are stored in an array which is indexed with the serial address of the updated cell. In this manner, every cell in the final BC map has a series of associated cable coordinates.

To avoid these breaks in cable movement continuity, a novel strategy for selecting the least cost path is adopted in the method of the present invention. When the calculated cost of moving to an adjacent cell is less than the stored "best cost" of that cell, the higher cost is replaced with the lower value. A new set of cable coordinates is then assigned to the cell. The preferred embodiment also stores one additional piece of information, the serial address of the predecessor cell. In other words, when a cell is updated, the neighboring cell responsible for the lower "best cost" value is the predecessor cell. Thus, associated with each cell is the address of the predecessor cell. With this additional data, finding a least cost path becomes an unambiguous process.

Figure 11:
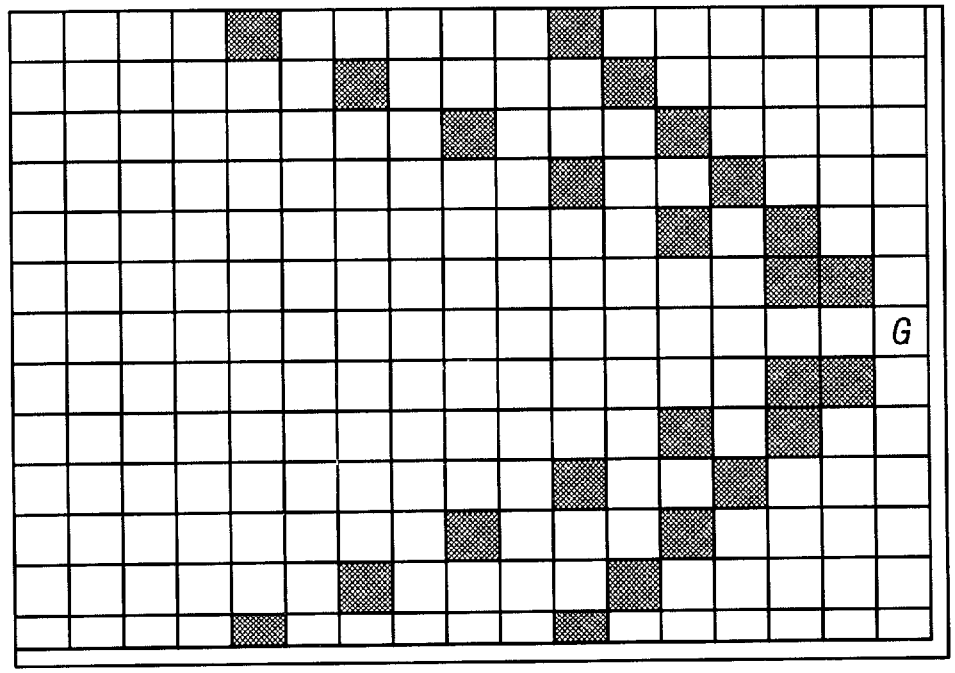
FIG. 11 illustrates different apertures for a spatial search in a preferred embodiment of the present invention.

Path determination begins with the "start cell" and obtains the address of the predecessor cells and moves to that new cell location. From this new cell location (the predecessor cell), the preferred embodiment obtains a new predecessor cell address and moves to that new cell location. This process is repeated until the goal cell is reached. This preferred method yields a least cost path with no ambiguity or split paths. Note that though there still may exist equal cost paths, the preferred method selects one of them in an unambiguous manner. An example of pseudo code for the preferred infill algorithm is listed in Table 2.

zontal as shown in FIG. 11. The apertures are defined by how many cells are allowed in a move forward for a single move. For example, a move Northwest, is 45 degrees from horizontal. However, a move two cells West and 1 cell to North, forms an angle 25.6 degrees off horizontal. Similarly, a move three cells left and one cell up yields an angle of 18.8 degrees off horizontal.

Typically, a target cell had been defined in terms of step values (pole on a pedestal function). However, in the present invention, potential values for cells are distributed over the entire map, therefore the present invention theoretically samples a nearby cell. The smaller apertures restrict the search space, which results in paths that are smoother and processing time is greatly reduced.

Figure 12:
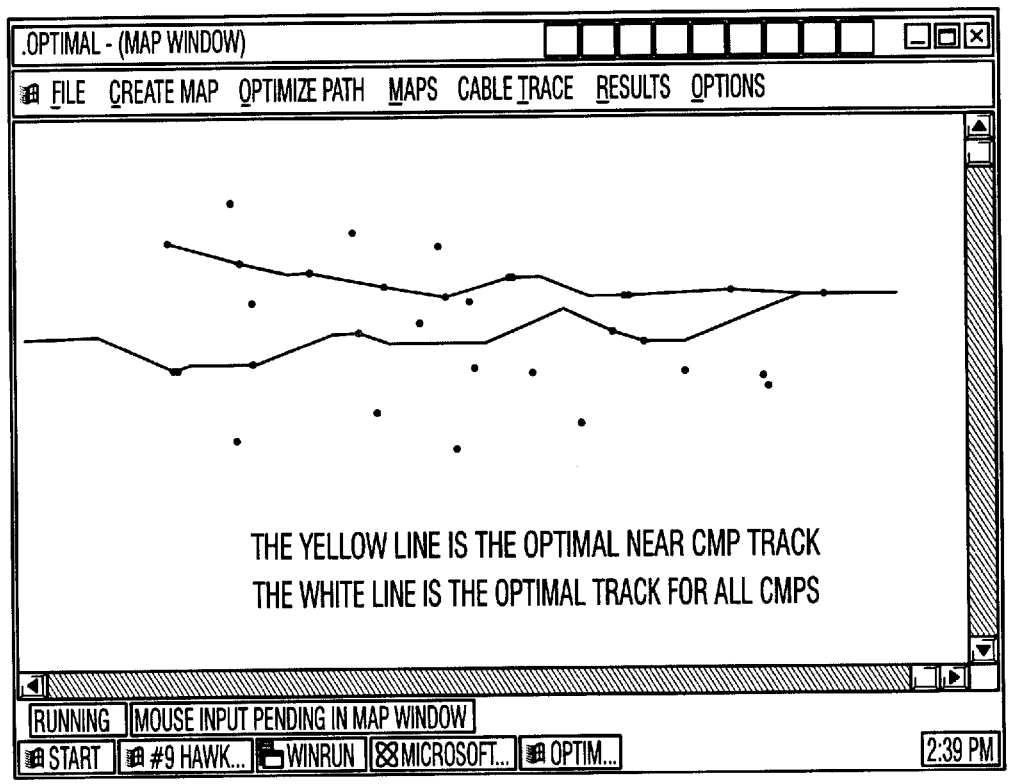
FIG. 12 illustrates, an optimal CMP in a preferred embodiment of the present invention.
Figure 13:
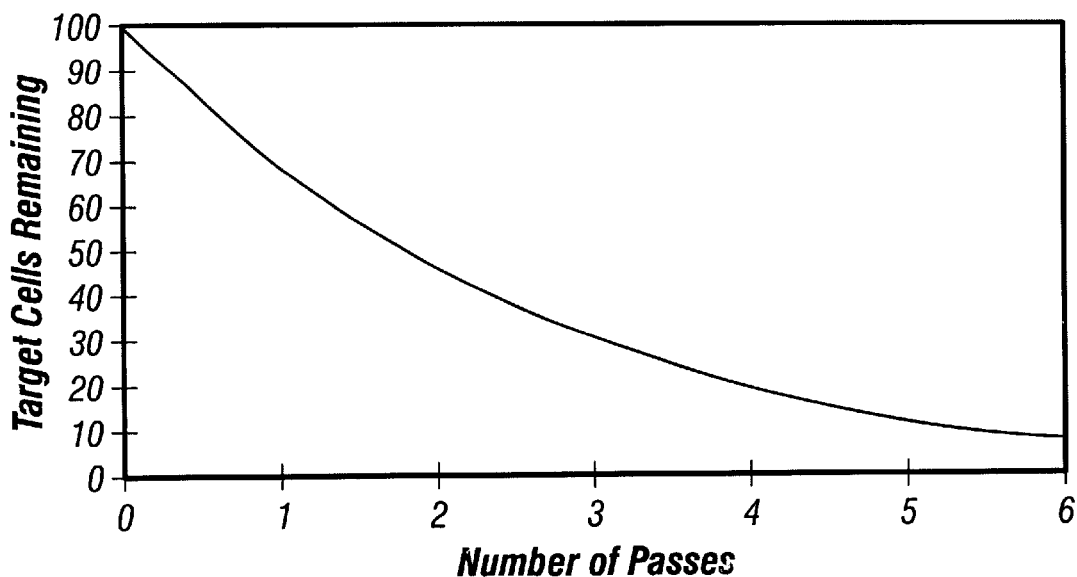
FIG. 13 illustrates the rate at which a test prospect was cleared in a preferred embodiment of the present invention.

In many cases the optimal path is not obvious. Consider the following example which illustrates how an optimal route calculation depends on the aperture setting. A wider aperture increases the search space and may result in a more rapidly changing path. For example in FIG. 12, the aperture set at 26.6 degrees results in fairly smooth tracks. In this example there were a total of 100 target cells consisting of 33 near cells, 33 mid cells, and 34 far cells. After each pass through the prospect, the number of target cells decreased. If this were not true, the paths would not be optimal. FIG. 13 illustrates a graph of the rate at which the test seismic project area was cleared. The exponential decay shape of the clearance rate curve is typical for seismic prospect areas using the preferred embodiment of the present invention. The exact number of target cells gathered per pass depends on the initial number of target tested cells and the target cell density.

TABLE 2

Pseudo Code for the Infill Algorithm

1. Initialization

Set all $BC_i = \infty$
    All Mail Flags $MF_i$ = false
    TODO list is empty
    $BC_{goal} = -100$ 2. Cost minimization: loop until TODO list is empty Remove top cell I from the TODO list and set $MF_i$ = false
    Move boat to an adjacent cell j and calculate cable coordinates
    For each of the three neighbors j of cell I (three neighbors for infill algorithm)
        cost (j) = $BC_i + \Sigma MC_m(k)$
        if costs(j) < $BC_j$
        $BC_j$ = cost
        Store cable coordinates and index to cell $BC_j$
        Predecessor cell I is value of array j (UpDateFrom(j) = I)
        If $MF_j$ = false add j to TODO list and set $MF_j$ = true 3. Path generation First path cell = UpDateFrom(start cell)
    Move into cell and obtain a new UpDateFrom address
    Loop until goal cell is reached Notation $BC_i$ is the ith element of best-cost propagation array
 (e.g. $BC_{start}$ = value of BC at the path start position
$MC_i$ is the ith element of map-cost array Mc.
$MF_i$ is the ith element of map-flag array MF, which
 indicates that a cell in on the TODO list.
TODO list is a list of cells that can potentially
 update their neighbors.

The use of potentials provides the additional benefit of permitting a variety of search spaces. The present invention searches adjacent cells that lie to the northwest, west, and southwest. This forms a 45 degree aperture from the hori- In the present example, over 53% of the target cells were collected in the first two passes. After each pass, the number of objective cells remaining declined. The decreasing target density implies that a greater effort need be expended to accumulate data. For example, if the objective cells are distributed over a large region, a continuous pass may result in the collection of only a single target cell.

Thus, essential to any infill optimization technique is the ability to accurately determine the shape of the streamer under dynamic conditions such as changes in the current, wind direction and vessel motion. A preferred embodiment provides a trained neural network to predict cable position. A neural net can be trained to emulate cable behavior by a training set of input and output data gathered from real cable behavior during primarily acquisition runs or from a cable model emulating a seismic run. In an alternative embodiment, the method optimizes each path for the duration of a project. To optimize paths for an entire project requires long term assumptions on the nature of changes in the weather and water currents. It should be noted however that a neural net or some other cable prediction method or apparatus is only preferred when the towing vessel is also the shooting or seismic source vessel. The present invention may also be utilized to optimize the path of two or more shooting vessels and thus enable a streamer to maintain a straight course. The multiple shooting vessel configuration is basically similar to the single boat with one exception. In the single vessel option, the vessel moves either Northwest, West or Southwest. The best move is the one that has the lowest cost. In a multiple vessel configuration, for example, two boats may move in these directions, which yields 9 possible moves. The costs are calculated by summing the "cost move" for each vessel. The correct move (of the 9 possible) is the one that yields the lowest cost. The method may be extended to any number n of shooting-vessels.

The present invention enables finding a single optimal path through the use of an infill map. This is cost effective and beneficial when such a route is nonobvious. For cases where the navigator knows an approximate path he wants to take, however, the exact route can be optimized by the present invention by searching a corridor around a set of position path points entered by the operator. In an alternative embodiment, additional offset range maps and boundary conditions are provided.

The infill program of the present invention provides several drop down menus. Options can be selected to direct operations of the present invention. The present invention provides an Input Potential Map File option, which enables the user to input a previously created map file. All map files end with a .grd extension. To find all maps the user simply types *.grd and the program displays all files with the .grd extension.

A Save Potential Map File option is provided which enables the user to save a created file. The user adds a .grd extension. The Reset Current Map File function enables the user to clear the screen. All current map information is deleted. If the user wants to retain the current map, he can save it before using the Reset option. The Exit function exits from the program and ends the session.

A Near CMP option is provided, which enables the user to place near cost maps CMP's on the map screen. After selecting the Near CMP option, the user places the cursor anywhere on the map screen and presses the left mouse button. This action places a yellow square on the screen indicating the location of a near trace CMP. Holding down the left button and moving the mouse results in a series of near trace CMP's.

A Mid CMP option is provided which enables the user to place mid CMP's on the map screen. After selecting this option, the user places the cursor anywhere on the map screen and presses the left mouse button. This action causes placement of a magenta square on the screen indicating the location of a mid trace CMP. Holding the left button and moving the mouse results in calculating a series of mid trace CMP's.

A Far CMP option is provided which enables the user to place far CMP's on the map screen. After selecting this option, the user places the cursor anywhere on the map screen and presses the left mouse button. This action causes places a cyan square on the screen indicating the location of a far trace CMP. Holding the left button and moving the mouse results in a series of far trace CMP's.

An Objects option is provided which enables the user to place objects on the map screen. After selecting this option, the user places the cursor anywhere on the map screen and presses the left mouse button. This action places a red square on the screen indicating the location of the object such as an island. Holding down the left button and moving the mouse results in a series of objects.

A Background option is provided which enables the user to reset a CMP location. For example if the user has defined a given cell as a near trace CMP and wants to delete this point, then the user chooses "back ground" and places the cursor on the cell and clicks on the left mouse button. This action deletes the point from the potential maps.

An Optimize Path option is provided which enables the user to choose the desired type of optimization. For example, the user may simply want to optimize the near traces and not include the far traces. The resulting paths will, of course, be quite different. The Near Traces option optimizes the path of the near traces and takes into account the mid and far traces. A Mid Traces option is provided which optimizes the path of the mid traces and takes into account the near and far traces. A Far Traces option is provided which optimizes the path of the far traces and takes into account the near and mid traces. An All Traces option is provided which optimizes the path of all contributors and uses maps from the near, mid, and far CMP's. A maps option is provided which enables the user to view individual maps. Since a white cell indicates a location that includes multiple CMP's, this option enables the user to see exactly which type of traces are included in a given cell.

A Near Cells option is provided which displays only the near cells. A Mid Cells option is provided which displays only the mid cells. A Far Cells option is provided which displays only the far cells. An Object Cells option is provided which displays only the object cells. An All Cells option is provided which displays all cells simultaneously.

A cable trace option is provided which enables the user to manually check a particular path to see if it is close to optimal. The user selects a starting row by clicking on the "starting row" box and entering an appropriate starting position. Alternatively, the start cell can be selected by the algorithm of the present invention. Valid ranges for a starting row are between 1–118. Once the starting row has been selected, the user can move the simulated cable through the CMP maps by using the F1, F2, and F3 function keys. The cable enters the screen from the right side and exits on the left side. When the cable begins to exit at the left side of the screen, a menu appears on the screen informing the user that the path is complete. The type and number of CMP's collected for any given path may be obtained by selecting a "results menu". For example, assuming that a user has found the optimal path for the far trances, viewing the "results menu" informs the user exactly how many far CMPs were obtained for a particular path. Even though the user requests optimizing the far traces, there is a finite possibility that there may be near and mid traces, which are also shown in the "results menu".

The various selection in the options menu enable a user to control different aspects of the optimization process. For example a user may want to limit the number of turns that the seismic vessel is allowed to make. This can be accomplished by increasing the penalty function and/or decreasing the search aperture. In some instances it may be desirable to weight the near traces more favorably than the far traces. In any case, these controls affect the path that is considered optimal.

Default controls are provided which represent a collection of preferred values that may be used for typical data sets. Changing these parameters can alter the calculated optimal path. In a preferred embodiment of the present invention, default values are stored and original default settings will be re-established on program restart.

Assuming that a map has a single far trace cell located in the center of the display screen, an optimal path may approach this point from any direction. In a grid based system, the least cost path approaches the point on a diagonal track rather than a horizontal track. There are several ways to get around this problem. One example would be to rotate the coordinate system by 45 degrees.

The present invention preferably provides an engineering parameter referred to as the "penalty" function. The penalty function variable assigns an additional cost associated with moving in a diagonal path. The higher the value of the variable, the more the cost. If the penalty value is set too low, the path may take abrupt turns and become very jagged. If the penalty value is set too high, the least cost path becomes a straight line. A preferred penalty value of 8 is set for an aperture of 45 degrees. When changing the aperture, one may consider changing the value of the penalty function.

Each active cell contributes to the overall cost map through a function of the form:

$$\text{Cost} = -\frac{W_i}{1 + R^n} \quad (7)$$

where

Wi=user defined weight for the cell type (near, mid, far)
R=distance from the current cell
N=exponent Because this type of function resembles a potential well, it is referred to as a potential function. As n increases, the well becomes narrower and begins a two dimensional step function. As n is lowered, the well widens. A preferred value of n=4 generates desired results. The valid range is 1–4. If the value of n is set too low, diagonal paths will be favored and thus the penalty function should be increased.

The scan function, when selected, searches for the best starting and ending cells. Preferably, five different selected starting positions are initially selected. The present invention evaluates the five selected entry locations. The preferred algorithm begins with a goal cell located in the last column (right portion of the screen) at five different row positions. A best-cost map is built for each of the different row positions. The total costs at column 1 are then compared. The least cost start and goal cells are identified from these cost maps. The user may want to define the start and ending rows when these points are obvious. The advantage of using this "user defined" option is that it decreases the calculation time for the least cost path by eliminating scans and associated calculations.

In order to determine an optimal path, the cable position is determined after each move the vessel makes. The infill program preferably uses a trained neural network or a very fast recursive algorithm for simulating the shape of the cable as outlined in above. In a preferred embodiment a neural network is the preferred method of determining the cable shape. Initial tests with neural networks have shown that, with proper training, neural networks are capable of determining the cable shape.

In a preferred embodiment an optimal path may be found even if the cable is subjected to a time varying feather. The infill program is able to determine an optimal path even in the presence of feathering. Preferably, the feathering of the cable is calculated by the neural network. The cells along the optimal path are preferably removed from the cost maps. For example if there are 50 active cells and the optimal path passes over 30 of them, those 30 cells are removed before the beginning of another pass. Preferably, only the remaining cells from the maps are displayed after the initial pass. This option is convenient for determining how many passes it will require to clear a seismic project. In an alternative embodiment, the acquired cells are not removed after each pass.

Preferably, a midpoint track from the vessel to the far receiver is plotted along with the optimal path. The midpoint track is plotted as a dotted line. This gives the user confirmation of the far and mid trace path. Implementing the 45 degrees option causes the present invention to search an area 45 degrees off horizontal. This may result in rapidly changing path directions. If this is the case, the aperture may be narrowed or the penalty function may be increased. In a preferred embodiment, selecting any of the apertures 26.6, 18.3 or 14.0 degree apertures narrows the search and speeds up the algorithm.

In general, the narrower apertures result in smoother paths. Setting the search aperture to a small value may result in a relatively horizontal path. In sparse maps the aperture is preferably greater than the aperture for dense maps. Since the smaller apertures do not search every cell, the user preferably increase the size of any obstacles in the map. For example, a 14-degree aperture searches every fourth cell. Therefore, obstacles preferably cover at least 4 cells as objects are preferably step functions and not potential functions which would appear over a large area. Thus, the objects should be increased in size, so that the program senses them and calculates a path around them.

The present invention provides a function, which assigns a weight to the near track potential function as described in equation 7. Valid values are 1–100. The present invention provides a function which assigns a weight to the mid track potential function as described in equation 7. Valid values are 1–100. The present invention provides a function which assigns a weight to the far track potential function as described in equation 7. Valid values are 1–100.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method for calculating an optimal path for marine seismic data collection within a seismic prospect area comprising the steps of:

(a) dividing a seismic prospect area into a map of cells;
(b) selecting a start cell;
(c) selecting a goal cell;
(d) calculating a cost of traveling from the start cell to an adjacent cell based on cell potentials;

(e) repeating step d until the cost of all adjacent cells has been calculated;

(f) selecting a predecessor cell; and (g) storing the predecessor cell in association with the start cell.

2. The method of claim 1 further comprising the step of: providing multiple offset cost maps for the seismic prospect area.

3. The method of claim 1 further comprising the step of: representing cell values as potentials spread over the entire map of cells.

4. The method of claim 1 further comprising the step of: determining and storing cable coordinates at each serial cell location.

5. The method of claim 1 further comprising the step of: eliminating multiple paths by storing a predecessor cell address in an updated cell.

6. The method of claim 1 further comprising the step of: providing limiting apertures to restrict possible search movement and to prevent a seismic streamer from looping back on itself.

7. The method of claim 1 further comprising the step of: calculating a marine steamer position in a neural network.

8. The method of claim 1 further comprising the step of: scanning a plurality of map cells to determine an optimal starting cell.

9. The method of claim 1 further comprising the step of: providing penalty values to promote the use of particular path direction.

10. The method of claim 1 further comprising the step of: building a best cost map for each of three offset ranges corresponding to near, mid and far traces.

11. The method of claim 1 wherein the cost is calculated by the following equation:

$$\text{Cos}t(j) = BC(i) + \sum_{1}^{m} MC_m(k).$$

12. The method of claim 1 further comprising the steps of:

(h) beginning with a start cell and moving to a bordering cell with least cost; and (i) repeating step (h) until a goal is reached.

13. The method of claim 1 further comprising the step of storing cable coordinates in an array which is indexed with serial address of the updated cell, when a cell is updated.

14. The method of claim 1, further comprising the step of replacing a higher cell cost with a lower-cell cost when the cell cost of moving to adjacent cell is less than the stored best cost of that cell.

15. The method of claim 14 further comprising the step of: assigning a new set of cable coordinates to the updated cell.

16. The method of claim 1 further comprising the step of storing the serial address of a predecessor cell as the neighboring cell responsible for the lower best cost value.

17. A method for determining an optimal path in a seismic survey comprising the steps of:

(a) selecting a start cell as a present cell;

(b) obtaining an address of a present predecessor cell for the present cell;

(c) moving to the present predecessor cell location;

(d) obtaining a next predecessor cell address for the present predecessor cell;

(e) moving to the next predecessor cell address; and (f) repeating steps until (b) through (e) until the next predecessor cell is a goal cell.

18. The method of claim 17 further comprising the step of restricting a search aperture to reduce processing search time.

19. The method of claim 18 further comprising the step of: finding optimal paths for the duration of a project.

20. The method of claim 1 wherein paths of two or more shooting vessels are optimized to enable a streamer to maintain a straight path.

* * * * *